Figure 1:
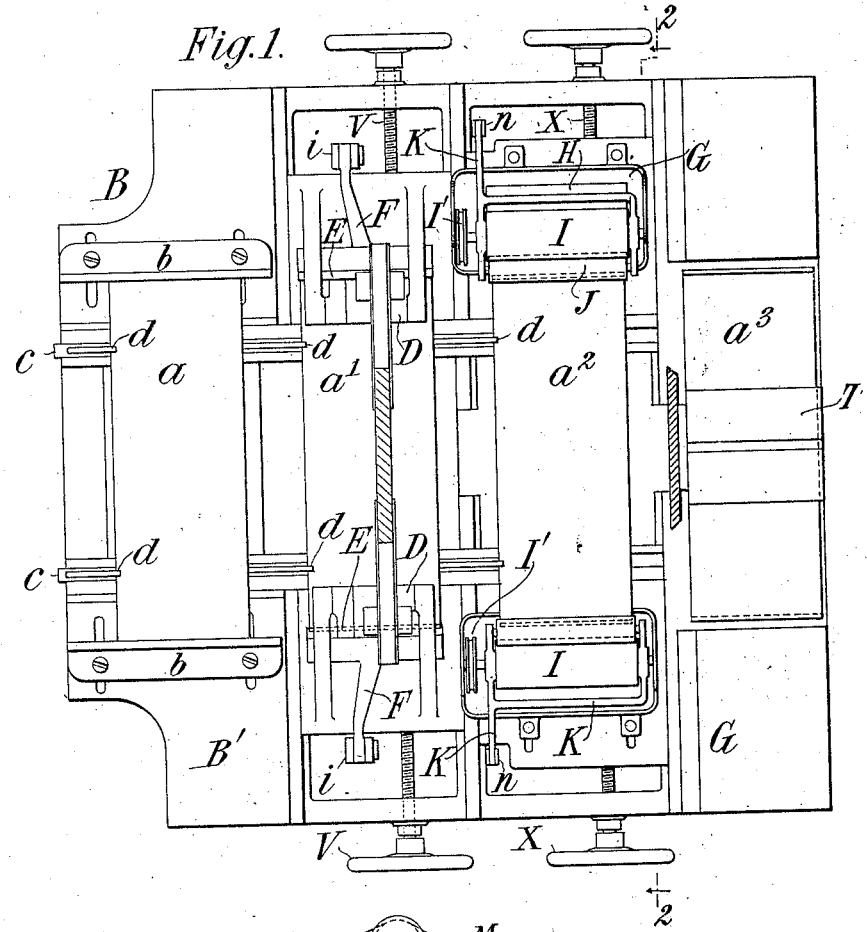

P. KRUSE.
METHOD OF AND MACHINE FOR MAKING CAN BODIES.
APPLICATION FILED OCT. 6, 1913.

1,180,661.

Patented Apr. 25, 1916.
3 SHEETS—SHEET 1.

WITNESSES:

INVENTOR
Peter Kruse
By Attorneys,

P. KRUSE.
METHOD OF AND MACHINE FOR MAKING CAN BODIES.
APPLICATION FILED OCT. 6, 1913.

1,180,661. Patented Apr. 25, 1916.
3 SHEETS—SHEET 2.

WITNESSES:
René Ppuine
Fred White

INVENTOR
Peter Kruse,
By Attorneys,
Fraser, Dunk & Myers

P. KRUSE.
METHOD OF AND MACHINE FOR MAKING CAN BODIES.
APPLICATION FILED OCT. 6, 1913.

1,180,661.

Patented Apr. 25, 1916.
3 SHEETS—SHEET 3.

WITNESSES:
Renè Bruine
T. J. Wallace

INVENTOR
Peter Kruse.
By Attorneys,
Fraser, Dunk & Myers

UNITED STATES PATENT OFFICE.

PETER KRUSE, OF NEW YORK, N. Y., ASSIGNOR TO E. W. BLISS COMPANY, OF BROOKLYN, NEW YORK, A CORPORATION OF WEST VIRGINIA.

METHOD OF AND MACHINE FOR MAKING CAN-BODIES.

1,180,661. Specification of Letters Patent. Patented Apr. 25, 1916.

Application filed October 6, 1913. Serial No. 793,721.

*To all whom it may concern:*

Be it known that I, PETER KRUSE, a citizen of the United States, residing in the borough of Brooklyn, county of Kings, city and State of New York, have invented certain new and useful Improvements in Methods of and Machines for Making Can-Bodies, of which the following is a specification.

In the making of can bodies, it is customary to feed the blanks first to devices which turn up the opposite edges of the blank to form hooks, the one being turned upwardly and the other downwardly; then to advance the blank and bend it around a former or horn in such manner as to interlock the hooks, this being done by expanding the horn so as to draw the hooked edges into engagement; then by pressure exerted through a rammer or bumper to swage and close the hooks together to form the side seam of the can body; and finally to feed the finished can out of the machine or to other mechanism. In a continuous machine the can body is brought into contact with soldering means whereby the side seam is soldered.

In the making of so-called sanitary cans, an adhesive packing material has been successfully used for closing or sealing the joints between the ends or heads of the can and the can body. It is desirable to be able to employ the same sort of material for sealing the side seam.

The present invention provides a method for successfully applying an adhesive or packing material to the turned-up hooks or flanges on the opposite edges of the flat blank, in order that when these are hooked together and pressed or flattened, the intervening material may effectually seal the side seam and make it tight so that it will withstand the subsequent processes used in canning, and particularly the heat and pressure required for sterilizing the contents of cans.

To this end the present invention provides means for holding or pressing the body blank having its oppositely turned-up hooks; means for applying such adhesive, comprising in the preferred form an applying roll and means for conveying adhesive thereto from a tank; and means for imparting such movement as will bring the said applying means and blank into operative contact, so that the turned-up hooks on the blank and the applying means shall be brought together in such manner that a sufficient quantity of adhesive will be applied against one or both of the hooks. It is preferable to combine this adhesive applying means with the existing mechanisms of a can body forming machine so that it shall intervene between the means for bending up the hooks on successive blanks and the means for bending such blanks around a former or horn and swaging down the seam to complete the can body.

The accompanying drawings show one embodiment and that which is believed to be the preferred embodiment of the invention.

Figure 2:
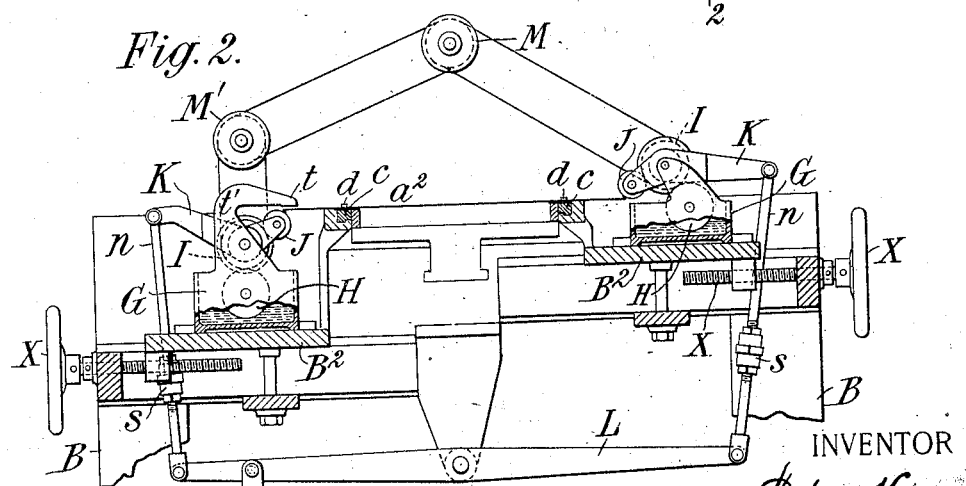
Figure 3:
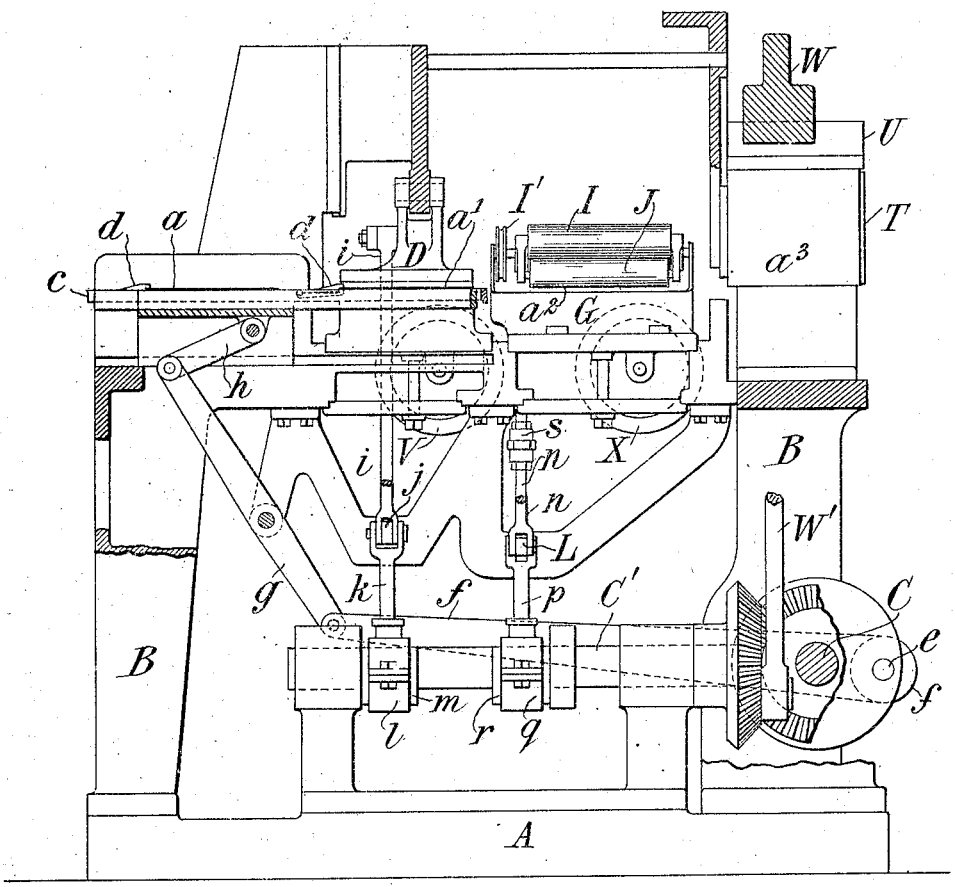
Figure 4:
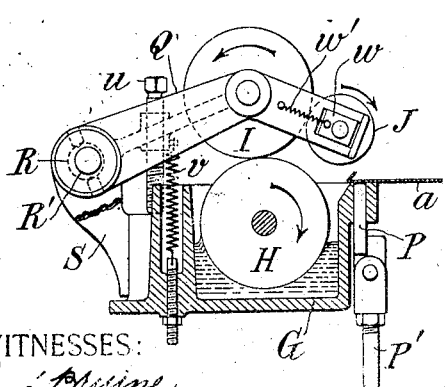
Figure 5:
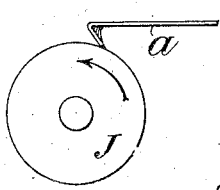
Figure 6:
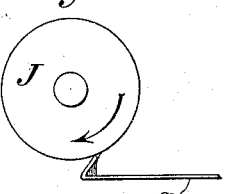
Figure 7:
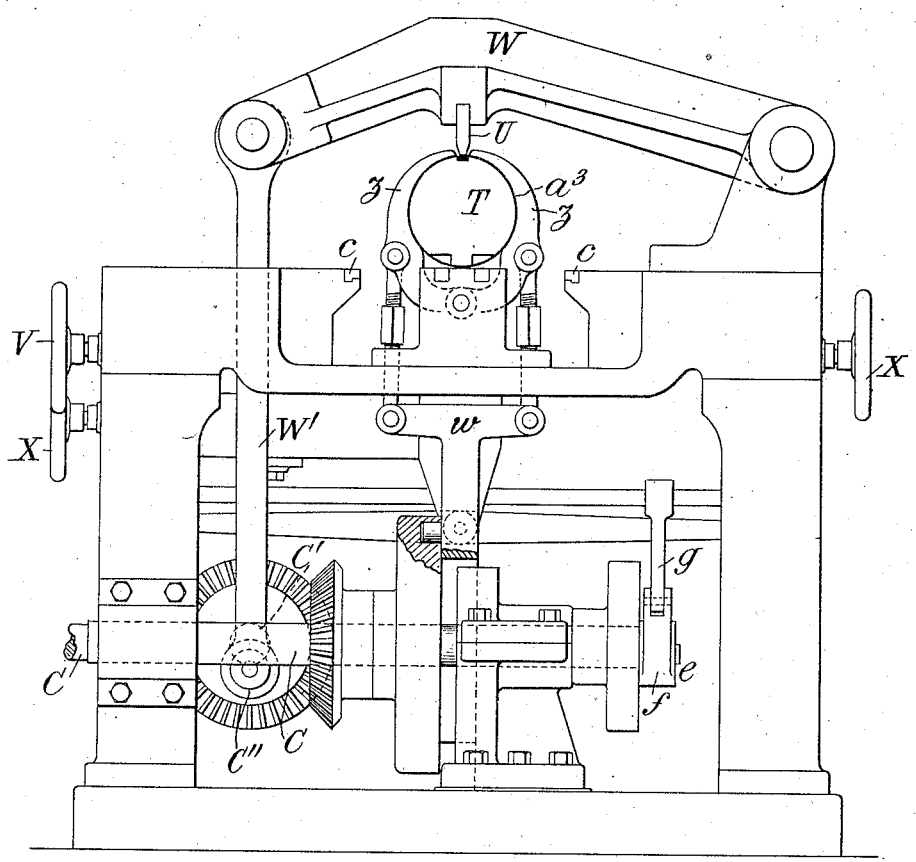

Figure 1 is a plan of the body forming machine, being partly in section to better show the operative parts; Fig. 2 is a transverse section taken generally in the plane of the line 2—2; Fig. 3 is a vertical longitudinal section, being mainly a mid-section, showing certain of the operative parts of an existing can body forming machine, with the addition thereto of the adhesive applying means introduced by the present invention. Fig. 4 is a vertical transverse section showing another construction. Figs. 5 and 6 are diagrammatic views showing the operation of applying the adhesive material. Fig. 7 is an end elevation of a machine partly broken away in vertical transverse section.

Referring to the drawing, A is the supporting base of the machine, B is the main frame thereof including an upper part or table B'.

$a$ $a^1$ $a^2$, etc., are the blanks in their successive positions. In practice it is desirable to provide an automatic feed so that a stack or pile of blanks may be supplied to the machine at suitable intervals; but as this forms no part of the present invention, the drawings illustrate merely a table B' having adjustable end gages $b$ $b$ between which a blank $a$ may be laid by hand upon the table and properly located. It is desirable that the successive blanks be fed forward in unison, and for this purpose various feeders or pushers are known, one suitable form being illustrated, and comprising sliding bars or rails $c$ $c$ extending longitudinally of the machine and moving in suitable slideways and carrying pushing fingers or pawls $d$ $d$ adapted to engage with the rear edges of the successive blanks and push them forward as the sliding bars $c$ $c$ are advanced. These bars are reciprocated, moving alternately forward to advance the blanks and backwardly to release them and engage the next succeeding blanks in the rear. This reciprocating motion is imparted by means of a crank $e$ on a transverse shaft C, the motion being communicated from the crank $e$ through pitman or connecting rod $f$, a lever $g$ and a link $h$ (Fig. 3). These parts are old and form no part of the present invention.

The first feed brings the blank to the position $a^1$ where it is acted upon by any usual construction of hooking mechanism. These hooking or edge-turning devices are so well known in the art as to require no illustration or description. Suffice it to say that the blank is clamped by suitable pressers D so as to hold it firmly, while its opposite ends or side edges protrude, and these protruding edges are then engaged by any of the well known hook-turning or flanging devices. No attempt has been made to show these hook turners in detail, but they occupy the positions indicated by the letters E E and are mounted on levers F F which are connected to rods $i$ $i$ extending downward and connecting to a transverse lever $j$, which in turn is connected by a rod $k$ to an eccentric strap $l$ engaged by an eccentric $m$ on a longitudinal shaft C', which is geared by miter gears to the shaft C so as to revolve at the same speed as the latter. This mechanism is so well known as to require no further description, and the particular mechanism forms no part of the present invention.

The second feeding operation brings the hooked blank to the position $a^2$, where the adhesive applying operation is performed.

The preferred means for applying adhesive is that shown in Fig. 2. The adhesive material or composition is placed in a tank or vat G within which is a partly submerged roller H which is free to turn and which is in contact with an upper roller I. To one of these rollers, preferably the latter, power is applied to rotate it. In contact with the roller I is an applying roller J. The rotation of the roller H carries up a coating of the viscid or adhesive material which is transferred as a thin and uniform coating to the surface of the roller I, and this roller in turn transfers a coating to the roller J, the latter being revolved by frictional contact with the roller I. The roller J normally stands near but out of contact with the hook or flange on the blank $a$. So long as these parts are out of contact, no application of adhesive occurs, this being the condition during the feeding movements of the blank. While the blank is resting in the position $a^2$, its hook or flange and the roller J are brought into contact and held together for a sufficient time to apply the requisite quantity of adhesive from this roller to the hook. This may be done either by moving the roller toward the hook or by moving the hook toward the roller. The period of contact necessary will depend upon the speed of the roller, the thickness of the film of adhesive, and to some extent upon the consistency of the adhesive material. At the end of the necessary time the reverse movement is effected whereby the parts are separated and the application of adhesive ceases; after which the blank is fed onward to the body-forming position $a^3$.

The adhesive may be applied to only one of the hooks or to both. It is preferable to apply it to both hooks. In the construction shown in Fig. 2 the adhesive is applied to both hooks, and consequently the parts G, H, I, J are duplicated; but by reason of the fact that one hook turns down while the other turns up, a corresponding rearrangement of the rollers is necessary. In this construction it is the rollers J which move, the hooked edges of the blank remaining stationary. For imparting movement to the rollers they are mounted on levers K K respectively, these levers being pivoted coaxially with the roller I, and these levers are connected by rods $n$ $n$ to the opposite ends of a lever L which is connected by rod $p$ and eccentric strap $q$ to an eccentric $r$ on the shaft C'. This is one suitable mechanism for imparting the necessary movements, which might readily be replaced by any one of numerous other mechanical movements for the purpose. Since one roller J has to move upwardly and the other has to move downwardly, the movements imparted by the opposite ends of the lever L to the respective levers K K occur in opposite directions. The necessary adjustments of the rollers may be made by means of adjusting sleeves $s$ $s$ for lengthening or shortening the rods $n$ $n$. If the metal of the blank is sufficiently stiff, the edge portion may be left unsupported as shown at the right in Fig. 2; for supporting the other edge portion of the blank against the upward pressure imparted by the roller J while applying the adhesive, it is preferable to provide a support $t$ arranged just above the marginal portion of the blank and supported on any suitable bracket, such as $t^1$. For rotating the adhesive applying rollers, a belt drive is shown, each roller I having a belt pulley I' and this being driven by belts from driving pulleys M M' (Fig. 2) which are rotated from any convenient shaft, for example from any overhead shafting.

An alternative construction is shown in Fig. 4. The relation of the rollers H, I, J, is the same as before, and they may be driven in the same manner, but instead of the roller J moving against the hooked flange of the blank, the latter is moved into contact with the roller. This is done by means of a lifter P coming under the hooked edge of the blank, and moved upwardly by means of a rod P' which extends downward and is connected to any suitable operating mechanism, such for example as an eccentric upon the shaft C'. This lifter is lowered during the feeding of the blanks and lifts the successive blanks into operative contact with the roller J, holding the blank there long enough to enable it to receive from the roller the required amount of adhesive. The rollers I, J, are shown as connected by a lever Q which is pivoted on an eccentric R on a shaft or stud R', the latter being hung in brackets S. By turning the stud R' the eccentric will raise or lower the end of the lever and thereby effect a movement of the roller J in the contrary direction. By means of this adjustment the roller J may be moved nearer to or farther from the position to which the hooked flange of the blank is lifted. For adjusting the thickness of the coating which is applied by the roller H to the roller I, an adjusting screw $u$ is provided which forms a stop serving to determine the approach of the roller I to the roller H. To supplement the effect of gravity in pressing the rollers together, it is desirable to introduce a spring $v$. It is also desirable to mount the roller J in sliding blocks $w$ which are drawn back by springs, $w^1$.

The applying roller J should revolve in such direction and should be so arranged relatively to the angle of the hooked flange on the blank, that it will apply the adhesive material within the bend of the hook in the manner shown in Figs. 5 or 6, which figures show the roller and the hook in operative contact. Sufficient adhesive material should be applied to substantially fill the bend of the hook. The amount of material applied is determined by the time during which the parts are in contact, which is capable of adjustment by the adjusting means $s$ in Fig. 2 which determines the extreme movement of the roller J, and hence its period of contact with the flexible edge portion of the blank. When the blank has thus had adhesive applied to its hooks, it is advanced to the position $a^3$ where it is engaged by the usual bending devices $z$ $z$ operated by slide $w$ and wrapped around the horn T, its hooks being interlocked in the well known manner by the expansion of the horn, and the seam being then closed or swaged down by the descending of the hammer or bumper U. These devices are shown in Fig. 7 but need not be described, being well known. The hammer is carried as usual on a lever W and which is moved by a crank C'' on the shaft C' through a rod W' in the usual manner.

The machine thus illustrated is capable of applying a viscid or tenacious adhesive material to the hooks or flanges of a can body blank, so that when these are interlocked and the side seam closed, the applied adhesive material will serve to seal every interstice in the seam and make the latter hermetically tight.

In the construction of can body making machines, it is customary to make them adjustable, so as to operate upon blanks of varying lengths to be made into can bodies of varying diameters. For thus adjusting the hook-bending means it is customary to provide adjusting screws V. V. To provide for the similar adjustment of the adhesive-applying means, screws X X are supplied, which on being turned by their hand wheels serve to displace lateral tables $B^2$ on which are mounted the adhesive receptacles G G.

The means described may be varied by the substitution of equivalents, and by modifications in mechanical construction, without departing from the present invention.

It will be understood that the machine provided by the present invention is not necessarily limited in its use to the applying of an adhesive material to the hooks of the can body whereby to seal the side seam, in lieu of soldering of this seam. The invention may be used if desired for applying any other cementing material. For certain purposes this material must be capable of withstanding the heat of the processing or sterilizing treatment, but for other uses where such processing is not necessary, a material may be used which would not withstand such heat. The particular cementitious material employed will be determined by the use to which the can or other receptacle is to be put.

It is to be understood that in this specification and in the following claims, I use the term "adhesive" to include any packing or sealing material which may be made to adhere to the marginal portion of the blank and by which the side-seam may be rendered tight, in contra-distinction to solder.

I claim as my invention:—

1. The described method of forming can bodies which consists in bending hooked flanges on the opposite edges of a can body blank, then applying an adhesive sealing material to a hooked edge flange on the blank, bending the blank to the shape of the can body, and finally seaming such edge flange to the opposite edge flange with such material confined between the seamed flanges to constitute a packing to make a tight joint.

2. A machine for forming can bodies comprising means for bending hooked flanges on the opposite edges of a can body blank, means for then applying an adhesive sealing material to a hooked edge flange on the blank, means for bending the blank to the shape of the can body, and means for seaming such edge flange on the opposite edge flange to form a can body, with such material confined between the seamed flanges to constitute a packing to make a tight joint.

3. Means for applying adhesive to the side hooks of a can body blank, comprising applying rollers each adapted to apply adhesive to the length of one such hook, and means for supplying adhesive to such rollers, and means for imparting opposite relative movements to the respective rollers and hooks of the blank to bring them into operative contact.

4. The combination of means for bending hooks on successive body blanks, means for bending such body blanks and forming the same into can bodies, and intervening means for applying adhesive arranged relatively to such bending means to apply such adhesive to the turned-up hooks of said body blanks and driving means for coactively operating said respective means.

5. The combination of an adhesive applying roller, means for holding a body blank, means for imparting movement to bring the roller and blank into operative contact, and adjusting means for varying the duration of such contact.

6. The combination with means for holding a body blank, of means for applying adhesive comprising an applying roller, a roller turning in contact therewith to apply adhesive thereto, a lever fulcrumed on the axis of the last named roller and carrying said applying roller, and means for displacing said lever to bring the applying roller into or out of contact with the side hook of the body blank.

7. The combination with means for holding a can body blank, of means for applying adhesive thereto comprising an applying roller, a vessel for holding a bath of adhesive, and means for supplying adhesive therefrom to said roller, with adjusting means for moving said adhesive applying means bodily to accommodate it to blanks of different lengths.

8. A mechanism for applying adhesive to the hooked flange of a body blank, comprising means for advancing successive blanks, means for receiving and holding the blank with its hooked flange presented in a predetermined direction, and means for applying adhesive arranged on the side toward which such hooked flange projects and movable relatively thereto so that such edge scrapes off adhesive therefrom onto such flange.

9. A mechanism for applying adhesive to the side hook of a can body blank, comprising means for holding the blank, an adhesive applying roller as long as the hook of the blank, and means for bringing the roller and such hook into operative contact.

In witness whereof, I have hereunto signed my name in the presence of two subscribing witnesses.

PETER KRUSE.

Witnesses:
 FREDK. C. FLADD,
 CHAS. J. ETTSWORTH.